H. SACK, DEC'D.
A. SACK, ADMINISTRATRIX.
UNIVERSAL ROLLING MILL.
APPLICATION FILED NOV. 30, 1908.

939,172.

Patented Nov. 2, 1909.

6 SHEETS—SHEET 1.

Witnesses
C. H. Potter
E. E. Moore

Inventor
Hugo Sack,
By Rymes, Townsend & Brickenstein,
Attorneys

H. SACK, DEC'D.
A. SACK, ADMINISTRATRIX.
UNIVERSAL ROLLING MILL.
APPLICATION FILED NOV. 30, 1908.

939,172.

Patented Nov. 2, 1909.
6 SHEETS—SHEET 3.

Witnesses

Inventor
Hugo Sack,
By
Attorneys.

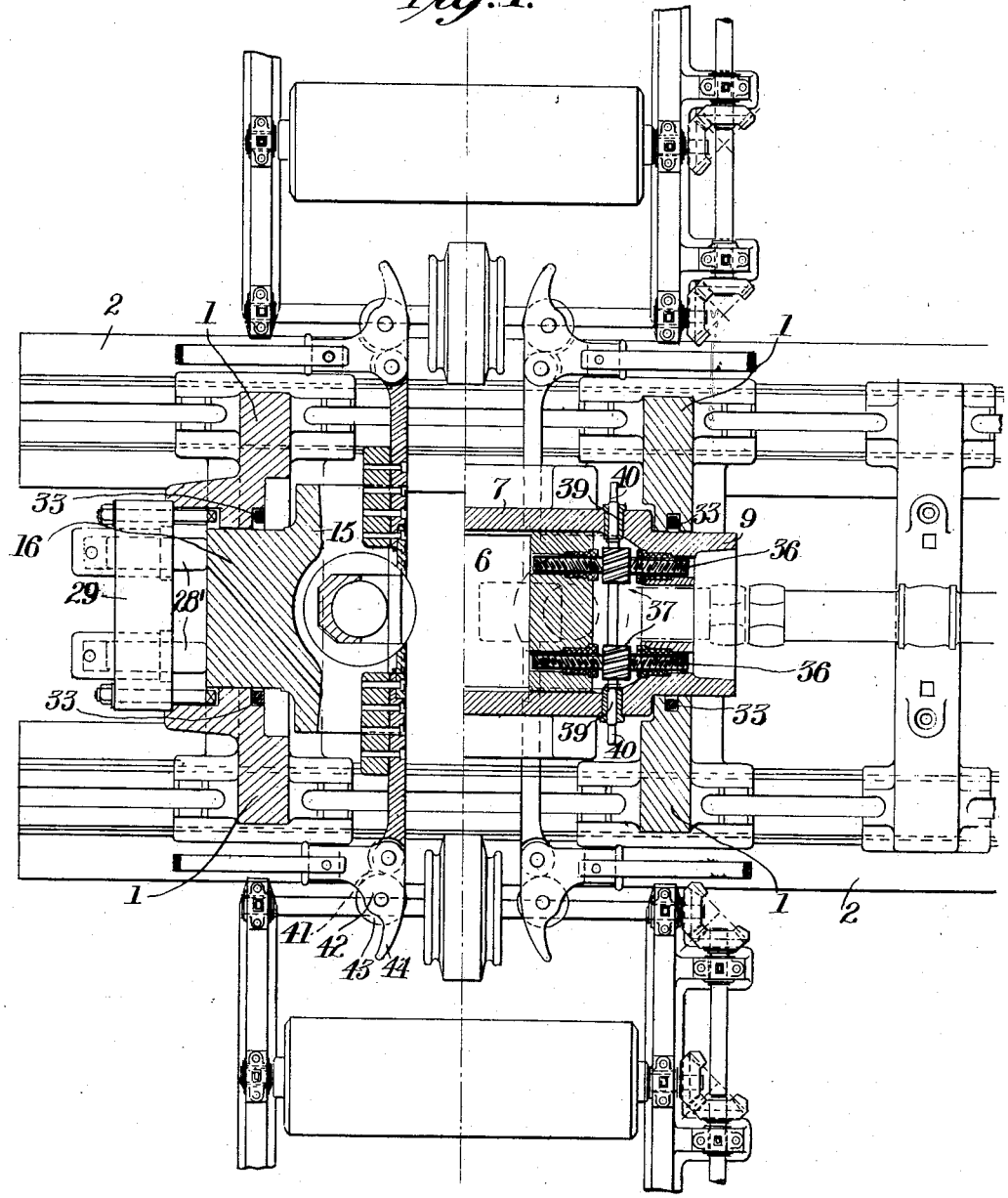

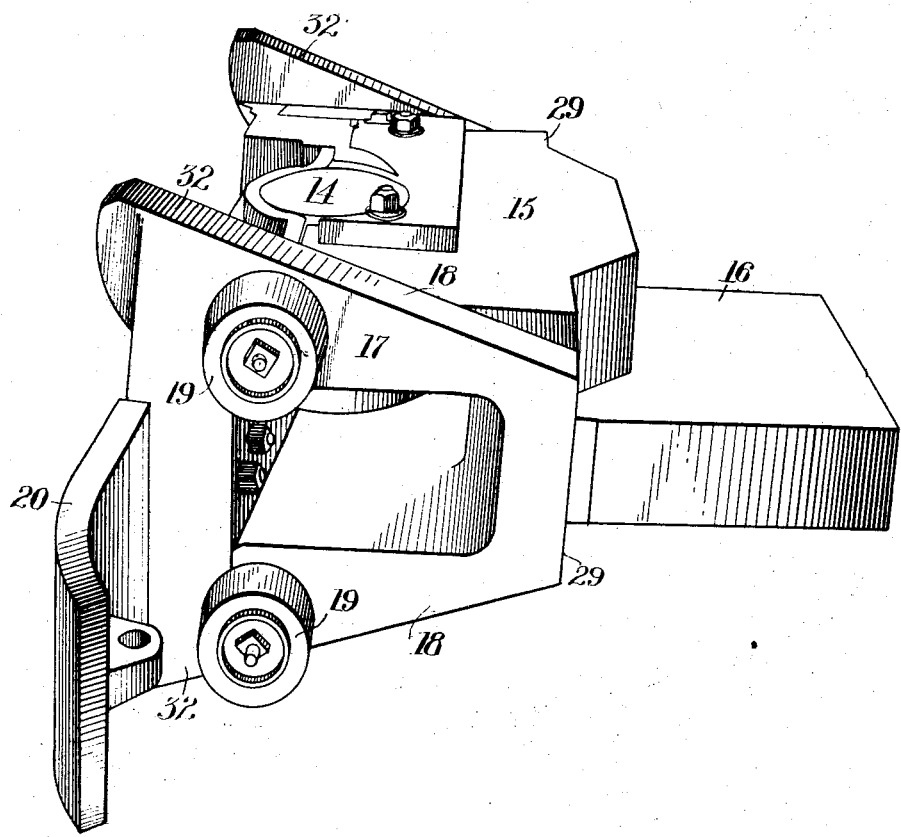

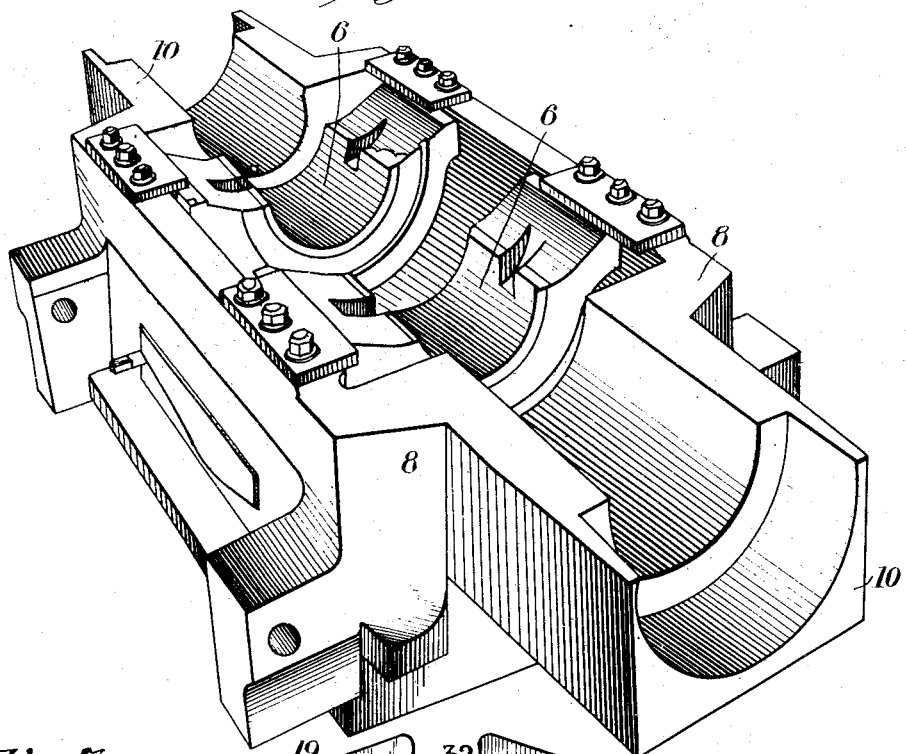
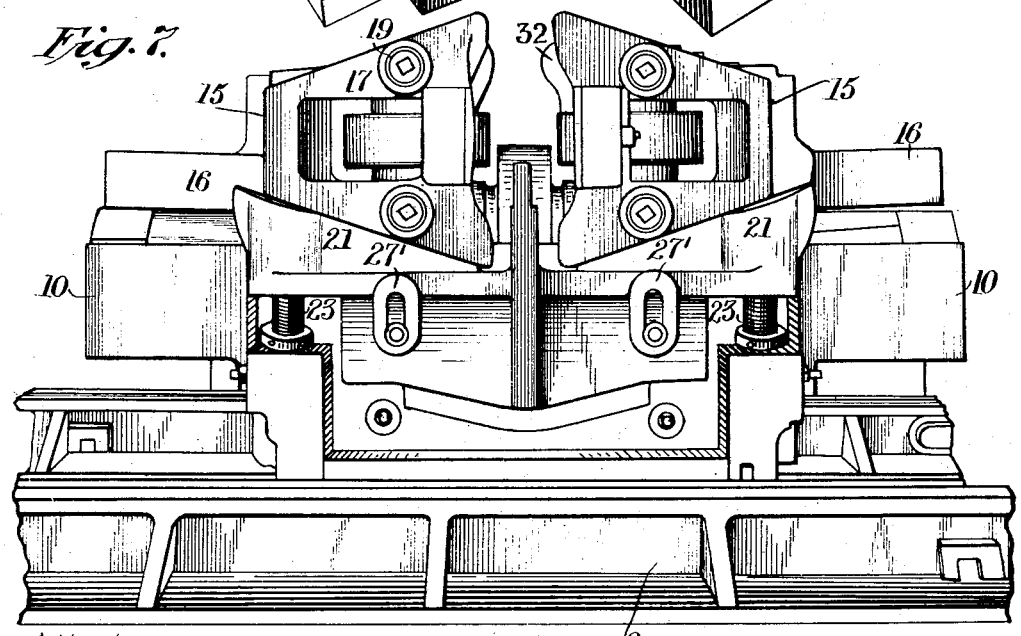

UNITED STATES PATENT OFFICE.

HUGO SACK, OF DUSSELDORF, GERMANY; ADELHEID SACK ADMINISTRATRIX OF SAID HUGO SACK, DECEASED.

UNIVERSAL ROLLING-MILL.

939,172.  Specification of Letters Patent.  Patented Nov. 2, 1909.

Application filed November 30, 1908. Serial No. 465,414.

*To all whom it may concern:*

Be it known that I, HUGO SACK, a subject of the Emperor of Germany, residing at Dusseldorf, Rhenish Prussia, Germany, have invented certain new and useful Improvements in Universal Rolling-Mills, of which the following is a specification.

This invention is a universal mill for rolling girders, comprising two horizontal and two vertical rolls arranged in the same plane, means being provided whereby the adjustment of the horizontal rolls simultaneously shifts the vertical rolls.

The present mill embodies specific improvements on that described and claimed in my copending application Ser. No. 341,142, filed October 29, 1906.

Figure 1:
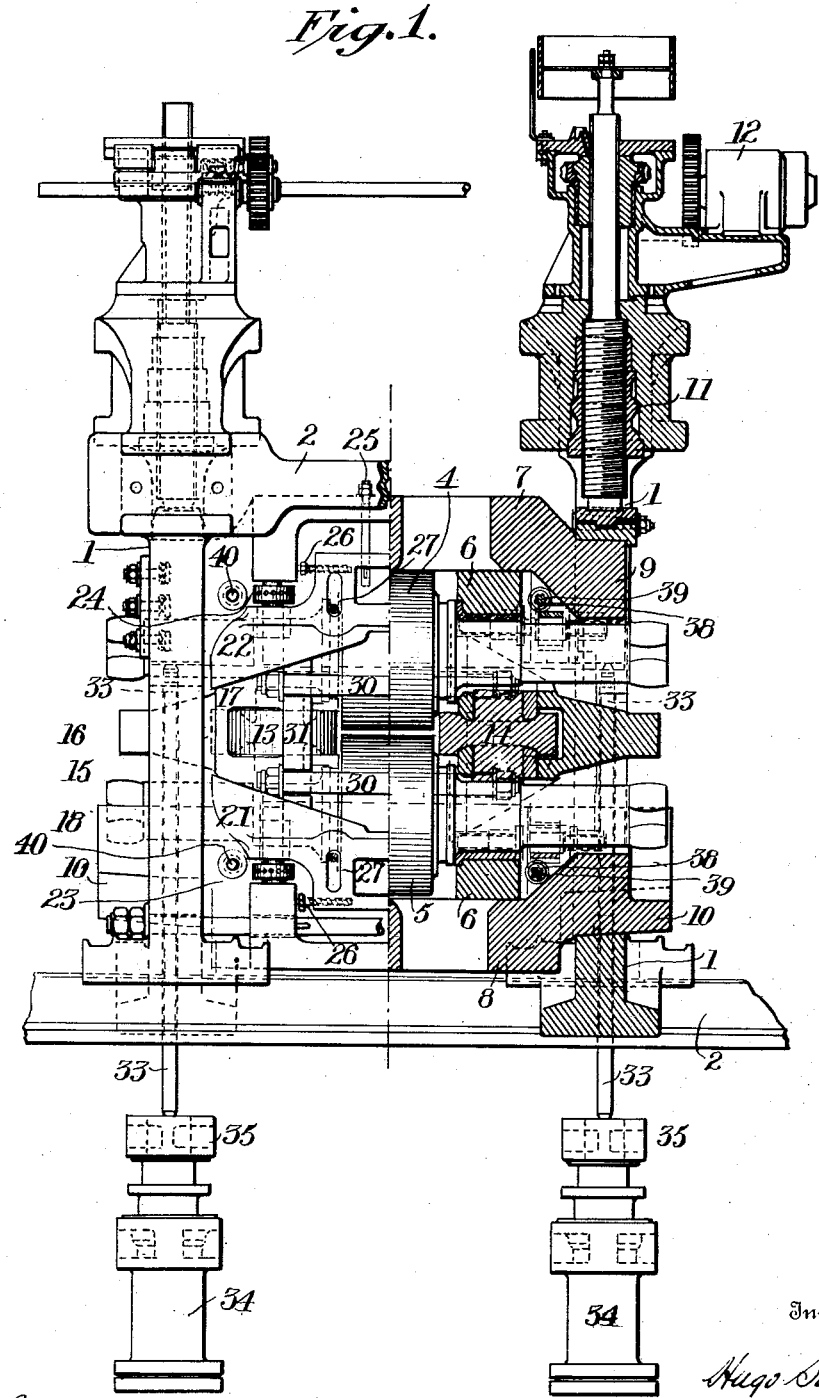
Figure 2:
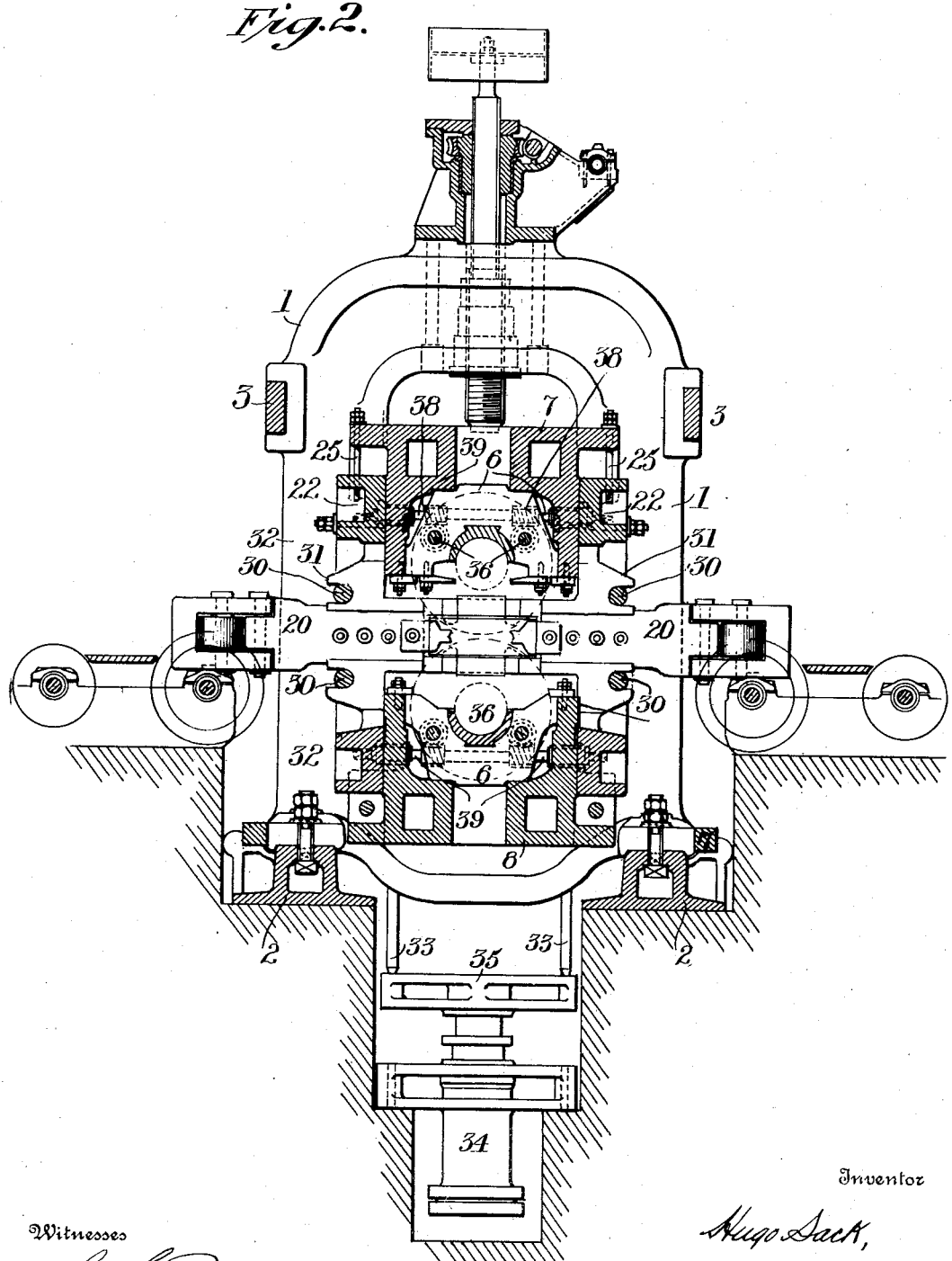
Figure 3:
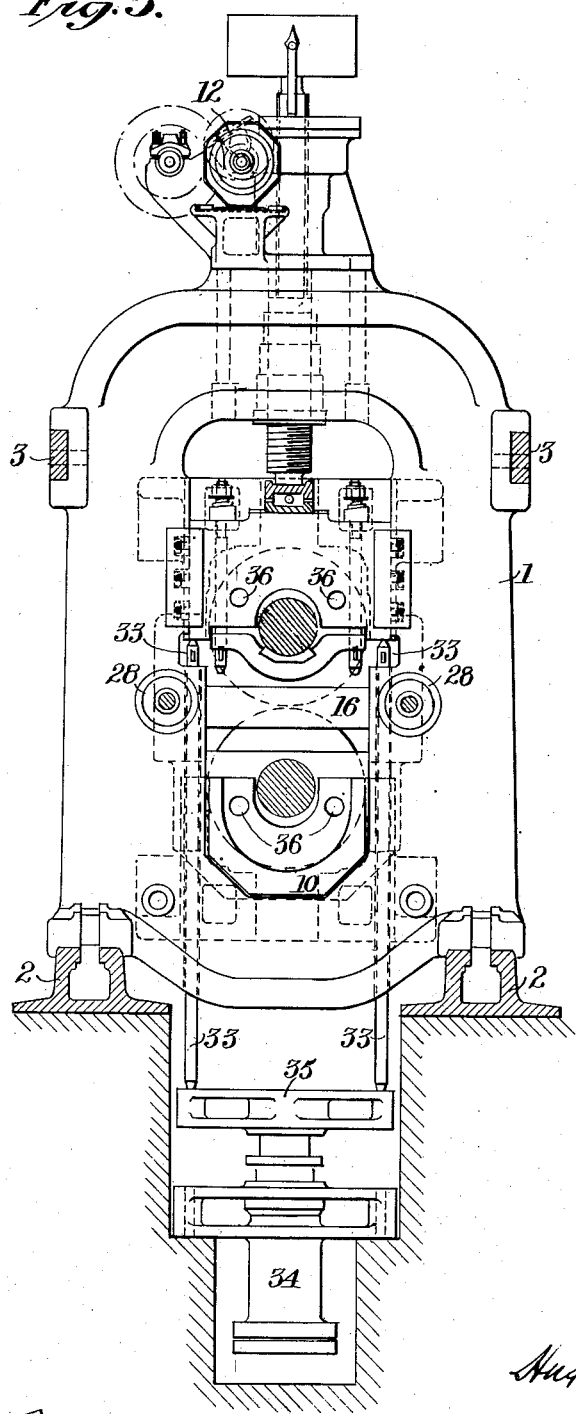

Referring to the accompanying drawing: Figure 1 is a front elevation of the mill, partly in longitudinal vertical section; Fig. 2 is a transverse vertical section of the mill, with the position of the rolls indicated by dotted circles; Fig. 3 is a side elevation of the mill; Fig. 4 is a horizontal section, in plan; Fig. 5 is a perspective view of one of the chocks which carries a vertical roll; Fig. 6 is a perspective view of the carrier for the lower horizontal roll, apart from the mill; and Fig. 7 is a front elevation showing a portion of the beams which support the mill, the carrier for the lower roll, the chocks for the two vertical rolls, and the lower setting rail for shifting the vertical rolls.

The frame of the mill comprises two spaced rigid stands 1, having guideways which are closed at the top and bottom. These stands are adjustably supported on and normally bolted to longitudinal foundation beams or sills 2. The upper ends of the two stands are connected and held rigidly in position by longitudinal tie-bars 3. The upper and lower horizontal rolls 4, 5 are journaled at their ends in bearings 6 which are supported by and longitudinally adjustable in upper and lower carriers 7, 8. These carriers extend entirely across the mill between the stands and have reduced ends 9, 10 which enter he guide-ways. One of the roll-carriers is vertically adjustable in the guide-ways. In the mill illustrated, the upper roll-carrier is vertically adjusted by screws 11, working in the closed upper ends of the stands and driven, through worm-gears, by an electric motor 12. The lower roll-carrier is rigidly supported, its ends 10 resting on the closed lower ends of the stands. Each of the vertical rolls 13, 14 is journaled at its upper and lower ends in a laterally-movable chock 15, having a reduced end or tail-piece 16 which enters the guide-way of one stand. At each side of each chock 15 is an integral vertical plate 17, the upper and lower edges 18 of which are flat and converge toward the tail-piece 16, each plate 17 thus constituting a wedge. Each chock has greasecups 19 for lubricating the roll-journals, and rigid outwardly-curved guide-plates 20 for directing the bar to be rolled. The greasecups illustrated comprise circular rings receiving disk plungers forced in by nuts on a central stud-bolt.

Adjustably attached to the lower and upper roll-carriers 7, 8, respectively, are duplicate members 21, 22, termed "setting rails", having inclined flat edges which are arranged to bear upon the upper and lower edges 18 of the wedge-plates 17. When the upper roll-carrier is forced downward to bring the horizontal rolls into closer proximity, the setting rails 21, 22 bear on the wedge-members 17 of the chocks 15 and thereby simultaneously force these chocks and the vertical rolls into corresponding closer proximity, maintaining the desired form of the pass between the four rolls. The lower setting-rail 21 is supported and vertically adjusted by screws 23, resting on the lower roll-carrier 8. The upper setting-rail 22 is adjustably supported by screws 24 and cottered bolts 25 depending from the upper roll-carrier 7. Both setting-rails are horizontally adjusted by set-screws 26, threaded into the ends of these rails and bearing against shoulders on the roll-carriers. The setting-rails shown in Fig. 1 are firmly held in adjusted position on the roll-carriers by bolts passing through vertical slots 27 in the rails and screwed into the roll-carriers. The setting-rail shown in Fig. 7 has depending slotted lugs 27' which receive clamping bolts.

The various elements thus far described, aside from the stands with closed upper ends, are substantially those of the mill described and claimed in my specified prior application. The improvements which are the subject-matter of the present application comprise means for rendering the mill more rigid; for supporting the upper roll-carrier;

for adjusting the bearings of the upper roll; and for guiding the blank.

In the mill described in my prior application, the vertical rolls are held in position to resist the pressure of the blank by the inclined faces 18 of the wedge-plates 17, bearing against the setting rails 21, 22. The vertical component pressures on the guide-rails are very great, so that the vertical rolls inevitably yield to a small but undesirable extent. In the present mill means are provided for holding the chocks of the vertical rolls rigidly in any adjusted position. One such means is illustrated in Fig. 3, consisting of two screw or other jacks 28 which bear against the end 29 of the wedge-plate 17. Another equivalent means is illustrated in Fig. 4, consisting of a pair of hydraulic rams 28' which bear directly against the tail-piece 16, the ram-cylinders being carried by a cross-head 29 bolted to the stand. When screw jacks are used, the vertical rolls are suitably adjusted toward each other after each pass, either by hand or by power, and the screws are then forced firmly against the tail-pieces of the chocks, maintaining them in position during the rolling. If desired, especially with thin sections, additional pressure can be brought on the flanges only, during the last stages of the rolling, by first tightening all four rolls, setting up the screw-jacks 28, and thereafter loosening the adjusting-screws of the upper horizontal roll. The web-thickness is thus preserved while the flanges are made thinner.

When the hydraulic rams 28' are used, their cylinders are connected to a source of fluid under low pressure, just sufficient to overcome the friction of the glands and bring the rams in contact with the chocks. Check-valves in the supply-pipes prevent efflux of the water and retain the rams in position against the chocks during the rolling.

When the mill is employed for finishing and the bar requires to be passed but once through the rolls, no adjustment during rolling is necessary and the roll-chocks may be rigidly tied together. Tie-rods 30 for connecting the chocks are shown in Figs. 1 and 2, nuts on their threaded ends engaging lugs 31 on the chocks. By using these tie-rods, preferably in addition to the screw-jacks or rams previously described, finished shapes of accurate dimensions and weight may be rolled.

In order to prevent the vertical rolls from shifting out of the plane of the pass during the rolling, the wedge-plates 17 of the roll-chocks are extended at their wider ends to provide ledges 32 which embrace and closely fit the vertical outer faces of the horizontal roll-carriers 7, 8, as shown in Fig. 1. These ledges 32, with the tail-pieces 16, entirely prevent any movement of the chocks or vertical rolls in the line of rolling. Yet the chocks may be readily removed to permit the vertical rolls to be changed, by simply shifting the stands 1 apart, as described in my application filed June 26, 1907, Serial Number 380854. Fig. 7 shows the chocks lying on the lower roll-carrier 8, the stands and upper roll-carrier having been removed.

Means for counterbalancing the upper roll 4 and its carrier 7 are illustrated in Figs. 1 to 4, comprising pairs of vertical rods 33 the upper ends of which bear against the lower side of the carrier, at each of its ends, and hydraulic cylinders 34 each having a piston cross-head 35 which supports one pair of rods.

Means for longitudinally adjusting the bearings 6 of the horizontal rolls in their carriers are shown in Figs. 1 to 4, comprising pairs of horizontal shafts 36 having right and left hand screws respectively engaging nuts fixed in the bearings and in the adjacent ends of the carriers. A pinion 37 is keyed to the middle of each shaft 36. The pinions of the adjacent shafts mesh with worms 38 on a transverse horizontal shaft 39, journaled in the carriers and having squared ends 40 to receive a wrench. This adjusting mechanism is omitted from Fig. 6.

Improved means for guiding the blank are shown in Figs. 2, 3 and 4, comprising members 41 which are pivoted to the outer ends of the guide-plates 20. Each member 41 has two arms, one of which, 42, contains an antifriction roller 43 and has a curved end 44, while the other arm carries a rigid lever 45 by which the guide-member may be rocked on its pivot. The roller-guides on the front side of the mill may thus be laterally separated to receive the blank and those on the back side may be brought closely into contact with it.

I claim:

1. A rolling mill, comprising stands, a pair of horizontal rolls, a vertical roll, a movable chock carrying said vertical roll, means whereby vertical movement of one horizontal roll laterally shifts said chock, and supplemental means for resisting the lateral rolling pressure on the vertical roll.

2. A rolling mill, comprising stands having guideways, a pair of horizontal rolls, horizontal-roll carriers having ends in said guideways, one of said carriers vertically adjustable, a pair of vertical rolls, movable chocks carrying said vertical rolls, means whereby vertical movement of one of said carriers laterally shifts said chocks, and supplemental means for resisting the lateral rolling pressure on the vertical rolls.

3. A rolling mill, comprising stands having guideways, a pair of horizontal rolls, horizontal-roll carriers having ends in said guideways, one of said carriers vertically adjustable, a pair of vertical rolls, movable chocks carrying said vertical rolls, means whereby vertical movement of one of said carriers laterally shifts said chocks, comprising complementary members respectively on said carriers and said chocks, said members having inclined abutting faces, and adjustable supports bearing against the outer ends of said chocks.

4. A rolling mill, comprising stands having guideways, a pair of horizontal rolls, horizontal-roll carriers having ends in said guideways, one of said carriers vertically adjustable, a pair of vertical rolls, movable chocks carrying said vertical rolls, means whereby vertical movement of one of said carriers laterally shifts said chocks, comprising complementary members respectively on said carriers and said chocks, said members having inclined abutting faces, adjustable supports bearing against the outer ends of said chocks, and tie-rods connecting said chocks.

5. A rolling mill, comprising stands having guideways, a pair of horizontal rolls, horizontal-roll carriers having ends in said guideways, one of said carriers vertically adjustable, a pair of vertical rolls, movable chocks carrying said vertical rolls, and means whereby vertical movement of one of said horizontal-roll carriers laterally shifts said chocks, comprising setting-rails on said carriers and wedge-plates on said chocks, said wedge-plates and setting-rails having inclined abutting faces and said wedge-plates having portions which extend outward over said carriers to prevent the chocks from shifting in the line of rolling.

6. A rolling mill, comprising stands having guideways, a pair of horizontal rolls, horizontal-roll carriers having ends in said guideways, roll-bearings longitudinally adjustable in said carriers, means for vertically adjusting the upper carrier, means for supporting and counterbalancing said upper carrier, a pair of vertical rolls, chocks carrying said vertical rolls, and means directly actuated by vertical movement of said upper carrier constructed and arranged to laterally shift said chocks.

7. A rolling mill, comprising stands, a pair of horizontal rolls, roll-carriers extending between said stands, roll-bearings supported and longitudinally movable in each carrier, and mechanism for adjusting said bearings, having portions engaging said bearings and carriers.

8. A rolling mill, comprising stands, a pair of horizontal rolls, roll-carriers extending between said stands, roll-bearings supported and longitudinally movable in each carrier, and mechanism for adjusting said bearings, comprising screws engaging said bearings and carriers, and means for rotating said screws.

9. A rolling mill, comprising stands, a pair of horizontal rolls, a pair of vertical rolls, a movable chock carrying each vertical roll, and a blank-guide carried by each chock and laterally movable thereon.

In testimony whereof, I affix my signature in presence of two witnesses.

HUGO SACK.

Witnesses:
EUGENE A. BYRNES,
G. E. MOORE.